(12) United States Patent
Glass et al.

(10) Patent No.: US 6,586,741 B2
(45) Date of Patent: *Jul. 1, 2003

(54) METHOD AND SYSTEM FOR TWO-DIMENSIONAL INTERFEROMETRIC RADIOMETRY

(75) Inventors: Carter M. Glass, Littleton, CO (US); Arthur Casimir Golubiewski, Littleton, CO (US); Lori K. Harrison, Evergreen, CO (US); Scott David Alexander, Morrison, CO (US); Christopher Taylor Herring, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/151,673

(22) Filed: May 20, 2002

(65) Prior Publication Data

US 2002/0134941 A1 Sep. 26, 2002

Related U.S. Application Data

(63) Continuation of application No. 09/757,351, filed on Jan. 8, 2001, now Pat. No. 6,452,181, and a continuation of application No. 09/731,113, filed on Dec. 6, 2000, now Pat. No. 6,441,376.

(60) Provisional application No. 60/219,157, filed on Jul. 19, 2000, and provisional application No. 60/169,484, filed on Dec. 7, 1999.

(51) Int. Cl.$^7$ .............................. G01J 5/02; G01S 3/78
(52) U.S. Cl. ....................................... 250/342; 250/332
(58) Field of Search ................................ 250/330, 332, 250/339, 342; 342/25, 52, 53

(56) References Cited

U.S. PATENT DOCUMENTS

| | | | |
|---|---|---|---|
| 4,768,156 A | 8/1988 | Whitehouse et al. | 364/521 |
| 4,814,772 A | 3/1989 | Wiley, deceased et al. | 342/351 |
| 4,929,951 A | 5/1990 | Small | 342/179 |
| 4,965,582 A | 10/1990 | Hellsten | 342/25 |
| 4,990,925 A | 2/1991 | Edelsohn et al. | 342/424 |
| 5,093,563 A | 3/1992 | Small et al. | 250/201.9 |
| 5,142,291 A | 8/1992 | Chang et al. | 342/424 |
| 5,260,708 A | 11/1993 | Auterman | 342/25 |
| 5,332,999 A | 7/1994 | Prati et al. | 342/25 |
| 5,552,787 A | 9/1996 | Schuler et al. | 342/25 |
| 5,608,405 A | 3/1997 | Pritt | 342/25 |
| 5,659,318 A | 8/1997 | Madsen et al. | 342/25 |
| 5,680,138 A | 10/1997 | Pritt | 342/169 |
| 5,835,055 A | 11/1998 | Van der Kooij | 342/25 |
| 6,011,505 A | 1/2000 | Poehler et al. | 342/25 |
| 6,011,625 A | 1/2000 | Glass | 356/357 |
| 6,028,300 A | 2/2000 | Rhoads et al. | 250/208.1 |
| 6,057,799 A | 5/2000 | Martin-Neira et al. | 342/351 |
| 6,219,185 B1 | 4/2001 | Hyde | 359/565 |
| 6,278,100 B1 * | 8/2001 | Friedman et al. | 250/201.9 |
| 6,433,325 B1 * | 8/2002 | Trigg | 250/201.3 |

FOREIGN PATENT DOCUMENTS

| | | | | |
|---|---|---|---|---|
| FR | 2 775 146 A1 | 2/1998 | | H04B/7/00 |
| WO | WO 01/48439 A2 | 7/2001 | | 250/342 |

* cited by examiner

Primary Examiner—Constantine Hannaher
Assistant Examiner—Albert Gagliardi
(74) Attorney, Agent, or Firm—Marsh Fischmann & Breyfogle LLP (57) ABSTRACT

A method and system are disclosed for imaging a planetary surface region of interest (ROI). In a primary application, a plurality of space vehicles having antennas mounted thereupon are utilized to collect thermal radiation emitted from the ROI and generate corresponding thermal emission signals. Such thermal emission signals may be combined to yield one or more simple interferometric fringes. The simple fringes may be employed to yield a pixel image of the ROI. In one aspect, one or more simple interferometric fringes may be utilized to generate one or more compound interferometric fringes for use in formation of the pixel image. One or more compound fringes may be utilized to generate additional levels of compound fringes for use in formation of the pixel image. In another aspect, the space vehicles may be positioned in a "near-field" imaging arrangement relative to the ROI and a matched filtering approach may be utilized for extracting amplitude data from the interferometric fringe(s) on a basis for use in pixel image formation.

38 Claims, 4 Drawing Sheets

METHOD AND SYSTEM FOR TWO-DIMENSIONAL INTERFEROMETRIC RADIOMETRY

RELATED APPLICATIONS

This application is a continuation application of both U.S. patent application Ser. No. 09/757,351, filed Jan. 8, 2001, U.S. Pat. No. 6,452,181 and of its parent U.S. patent application Ser. No. 09/731,113, filed Dec. 6, 2000, U.S. Pat. No. 6,441,376 which claim priority to U.S. Provisional Patent Application Ser. No. 60/169,484, filed Dec. 7, 1999, and to U.S. Provisional Patent Application Ser. No. 60/219,157, filed Jul. 19, 2000, the entirety of which applications are hereby incorporated by reference.

FIELD OF THE INVENTION

The present invention relates to imaging systems in which two or more complex signals of a region of interest may be combined to yield one or more interferometric images. More particularly, the invention is directed to a method and system for two-dimensional radiometric imaging of a planetary surface region of interest utilizing thermal radiation emitted by the region of interest.

BACKGROUND OF THE INVENTION

Computed imaging systems are utilized in a wide variety of applications. Of particular interest here is the use of radio frequency antennas to collect complex signals employable to obtain high quality images of planetary surfaces.

Such complex images are typically obtained by overhead transmission/reflected receipt of pulses of energy at a pre-determined frequency. In the latter regard, microwave radiation has been advantageously employed due to its ability to yield high resolution images in virtually all weather conditions and at all times (i.e., day and night).

While such systems have been utilized with success, they require the use of radiation signal transmission payloads on one or more aircraft or satellites (i.e., "space vehicles"). As may be appreciated, such transmission payloads add significant weight, complexity and cost to an imaging system. Additionally, the use of active transmitters entails significant attendant power requirements. Further, the active transmission of microwave signals toward a region of interest is detectable and may be undesired in certain applications.

SUMMARY OF THE INVENTION

In view of the foregoing, a primary objective of the present invention is to provide an improved imaging system and method that reduces imaging componentry payload and complexity on space vehicles utilized to collect imaging data. Related objectives are to reduce on-board power requirements and componentry costs associated with the obtainment of imaging data on space-borne vehicles.

Another important objective of the present invention is to provide a radiometric imaging system and method that is passive in nature and thereby avoids the active transmission of energy signals to an image region of interest to form a pixel image thereof.

An additional main objective of the present invention is to provide an imaging system and method that reduces the number of space vehicles and associated antennas necessary for generating high-resolution images.

Yet another objective of the present invention is to provide an imaging system and method that provides high-resolution images in inclement weather and day/night conditions.

The above objectives and additional advantages are realized by the present invention. To do so, the present inventors have recognized that even though thermal emissions from a planetary surface region of interest are of random phase and amplitude, such emissions may be assumed to be largely isotropic and mutually coherent at a receiving antenna (e.g., as received or time-shifted), and may be collected and processed in a manner that allows such randomness to be effectively removed. Relatedly, it has been recognized that thermal radiation collection and processing can be carried out in a manner that reduces the number of antennas necessary to yield high-resolution images. At the outset it should be noted that while the present invention is particularly apt for radiometric imaging applications, certain aspects may also be employable in active imaging arrangements.

The inventive system contemplates a plurality of space vehicles located in known relative positions over a planetary surface region of interest (ROI). At least a corresponding plurality of antennas are mounted on the space vehicles to collect radiation emissions from the ROI (e.g., thermal or blackbody radiation) and provide corresponding thermal emission signals. In turn, processor means (e.g., one or more signal processors) may be utilized (e.g., either on-board the space vehicles and/or more preferably at another location) to combine the thermal emission signals and obtain interferometric fringe signals employable to form a pixel image of the ROI. As will be appreciated, the formation and use of interferometric fringes effectively removes phase randomness from the collected signals.

In one aspect of the invention, the space vehicles may be spaced at different relative distances therebetween, wherein the collection antennas collectively define a "sparse aperture". For such purposes, the space vehicles may be located so that two or more of the antennas are horizontally and/or vertically offset from each other in relation to the imaged ROI during imaging. Such an arrangement allows the thermal emission signals obtained by the antennas to be processed in varying combinations, wherein each combination yields a different interferometric phase measurement based upon a corresponding different interferometric baseline. As such, the multiple different interferometric phase measurements can effectively "fill-in" an array of interferometric images employable in pixel image formation for the ROI. As will be appreciated, the differential spacing of antennas to collectively define a sparse aperture facilitates reduction of the overall number of space vehicles required to yield high-resolution ROI images.

In a further aspect of the invention, the space vehicles may be positioned in a "near-field" imaging arrangement to collect thermal emissions from an ROI. That is, the space vehicles may be positioned so that the imaging center axes for at least two of the antennas define an angle θ of at least about 2° therebetween, and more preferably about 2° and 15° therebetween, depending upon the collection center frequency of the antennas. In the latter regard, the antennas may be provided to collect thermal emissions over a collection bandwidth of between about 1 MHz and 1 GHz with a center frequency of between about 1 GHz and 100 GHz. The establishment of a near-field imaging arrangement also facilitates the obtainment of high-resolution ROI images.

In one arrangement, a plurality of antennas may be mounted on a corresponding plurality of satellites located in a known constellation passing over an ROI to be imaged. More particularly, two or more satellites may be located in corresponding repeatable orbits having relatively small differences in eccentricity and/or inclination (e.g., Hill's orbits), wherein the corresponding antennas are horizontally and/or vertically offset in a known geometry relative to the ROI for imaging. By way of example, four satellites may be positioned in known orbits to laterally define a repeatable Y-shaped pattern for sparse aperture imaging. Further, at least two of the satellites may be positioned so that the center imaging axes of the corresponding antennas mounted thereupon define an angle of about 2° to 15° therebetween, thereby yielding a near-field imaging arrangement. In earth imaging applications, the satellites may be disposed in low-earth orbits, wherein the satellites are placed at altitudes and spacings consistent with near-field operations.

In conjunction with noted aspects of the present invention, it should be recognized that the antennas should be provided in a spotlight mode (e.g., via gimbaled mounting) so that they remain pointed at an imaged ROI during an imaging, or "dwell", time period. Further in this regard, the antennas should be provided to collect thermal emissions from overlapping portions of the ROI in a substantially simultaneous manner to maintain mutual coherence. In turn, the thermal emissions collected from the ROI at each of the antennas may be substantially simultaneously sampled at a predetermined frequency (e.g., at least the Nyquist rate) during a given dwell period, thereby yielding an ROI thermal emission data set comprising each thermal emission signal. Such ROI data sets are combinatively employed by the processor means for image formation.

In the latter regard, and in another general aspect of the present invention, the processor means may be provided to combine, or correlate, at least a first thermal emission signal (e.g., collected by the first antenna) with a complex conjugate of at least a second thermal emission signal (e.g., collected by a second antenna) to obtain at least a first "simple" interferometric fringe signal. As will be appreciated, it is generally preferably to correlate a plurality of different pairs of thermal emission signals to obtain a plurality of different simple interferometric fringe signals. Further, and in order to enhance mutual coherence, it may be desirable in certain applications to time-shift one of the thermal emission signals of a given pair prior to correlation (e.g., in high bandwidth applications).

After formation, each simple interferometric fringe signal(s) may be low-pass filtered to yield a corresponding averaged, or "smoothed", signals, wherein amplitude randomness is effectively removed. In turn, the processor means may correlate at least the first simple interferometric fringe signal and at least one other signal for the ROI (e.g., obtained/generated pursuant to the corresponding-in-time receipt of thermal emissions from the ROI) to obtain at least one "compound" interferometric fringe signal employable in the formation of a pixel image of the ROI. The signal that is combined with the first simple interferometric fringe signal may be one of a first thermal emission signal, second thermal emission signal or third thermal emission signal (e.g., collected by a third antenna), or perhaps more preferably, a second simple interferometric fringe signal obtained by combining one of the first and second thermal emission signals with a complex conjugate of a third thermal emission signal. As will be appreciated, it is generally preferable to form a plurality of compound interferometric fringe signals for use in image formation.

By way of example, a first simple interferometric fringe signal (e.g., which correlates thermal emission signals generated by first and second antennas) may be combined with a second simple interferometric fringe signal (e.g., which correlates thermal emission signals generated by third and fourth antennas) to obtain a first compound interferometric fringe signal. Similarly, simple fringe correlations of the first and third thermal emission signals and of the second and fourth thermal emission signals can be further correlated to obtain a second compound interferometric fringe signal. Further, the first and second compound interferometric fringe signals may be further combined in an additional stage. The formation/utilization of simple interferometric fringes and compound interferometric fringes particularly facilitates a sparse aperture imaging arrangement, thereby reducing the number of space vehicles/antennas needed to generate high-resolution images.

In yet a further aspect of the present invention, the processor means may be provided to extract pixel value (e.g., complex values (i.e., comprising phase and amplitude components) or real amplitude values) from at least one and preferably a plurality of interferometric fringe signals employed for image formation on a per pixel location basis. In turn, the extracted pixel values are employable by the processor means to "develop" the pixel image of the ROI. By way of primary example, for each different interferometric fringe signal employed for ROI pixel image formation, the processor means may provide for the corresponding application of a plurality of different matched filters (e.g., corresponding with each of a plurality of pixel locations for the ROI pixel image to be formed) to obtain a plurality of extracted pixel values in corresponding relation to each of the plurality of pixel locations. In turn, the pixel values corresponding with each given pixel location may be utilized to form an interferometric image signal (e.g., for each interferometric fringe signal employed for image formation). In one arrangement, for each given one of a plurality of interferometric fringe signals employed, the extracted pixel values for each given pixel location may be combined to obtain a corresponding interferometric image signal. The plurality of interferometric image signals corresponding with the plurality of interferometric fringe signals employed may be merged (e.g., via complex summation and/or simple or weighted averaging) to yield the ROI pixel image. The utilization of separate matched filters for each pixel location and each interferometric fringe signal employed facilitates near-field imaging of an ROI as discussed above.

In view of the foregoing, it will be appreciated that an inventive method may comprise the steps of collecting thermal emission from a planetary surface region of interest (ROI) by a plurality of spaced antennas to obtain a corresponding plurality of thermal emission signals. Following collection, the method further includes the step of first combining at least a first thermal emission signal with a complex conjugate of at least a second thermal emission signal to obtain at least a first simple interferometric fringe signal. Preferably, a plurality of different simple interferometric fringe signals are formed from different pairs of collected thermal emission signals, wherein the data comprising one of each such pairs may be time-shifted to maintain mutual coherence. Each simple interferometric fringe signal may be low-pass filtered to remove undesired high-frequency components and otherwise yield an averaged signal.

In one aspect, the inventive method may further comprise the step of second combining at least a first simple interferometric signal with another signal for the ROI (e.g., a signal generated from corresponding-in-time thermal emissions from the ROI) to obtain at least a first compound interferometric fringe signal. In this regard, the second combining step may provide for the combining of one of the first and second thermal emission signals with the complex conjugate of a third thermal emission signal to obtain a second simple interferometric fringe signal. As such, the noted first compound interferometric fringe signal may be generated by combining a first simple interferometric fringe signal with one of (i) the second simple interferometric fringe signal, and (ii) one of said first, second and third thermal emission image signals. Preferably, a plurality of different compound interferometric fringe signals are formed. As noted, the formation/use of one or more compound interferometric fringe signals in image formation facilitates the use of a sparse aperture arrangement.

In another aspect the inventive method may provide for (i) collecting thermal radiation at the collection antennas over a predetermined frequency bandwidth of about 1 MHz to 1 GHz, and (ii) positioning at least two of the collection antennas to define an angle of at least about 2° between their respective center imaging axes (e.g., to define a near-field imaging arrangement). Further, for at least a first interferometric image signal, and more preferably for each given one of a plurality of interferometric fringe signals (e.g., simple and/or compound), the inventive method may include the step of applying a different matched filter corresponding with each of a plurality of pixel locations to interferometric signal data to extract a plurality of pixel values (e.g., complex values or real amplitude values) corresponding with each of said plurality of image pixel locations. Then, for each interferometric fringe signal employed, the inventive method may include the step of combining the pixel values corresponding with each of the plurality of pixel locations (e.g., summing) and utilizing the combined pixel values to obtain an interferometric image signal employable in the formation of the pixel image of the ROI. Where matched filtering is applied to a plurality of different interferometric fringe signals, the resultant plurality of interferometric images signals may be merged to yield the ROI pixel image. By way of example, such merging may provide for the averaging or weighted averaging of the different interferometric images in generating the ROI pixel image.

Additional aspects and advantages of the present invention will become apparent to those skilled in the art upon consideration of the further description provided hereinbelow.

DETAILED DESCRIPTION

Figure 1:
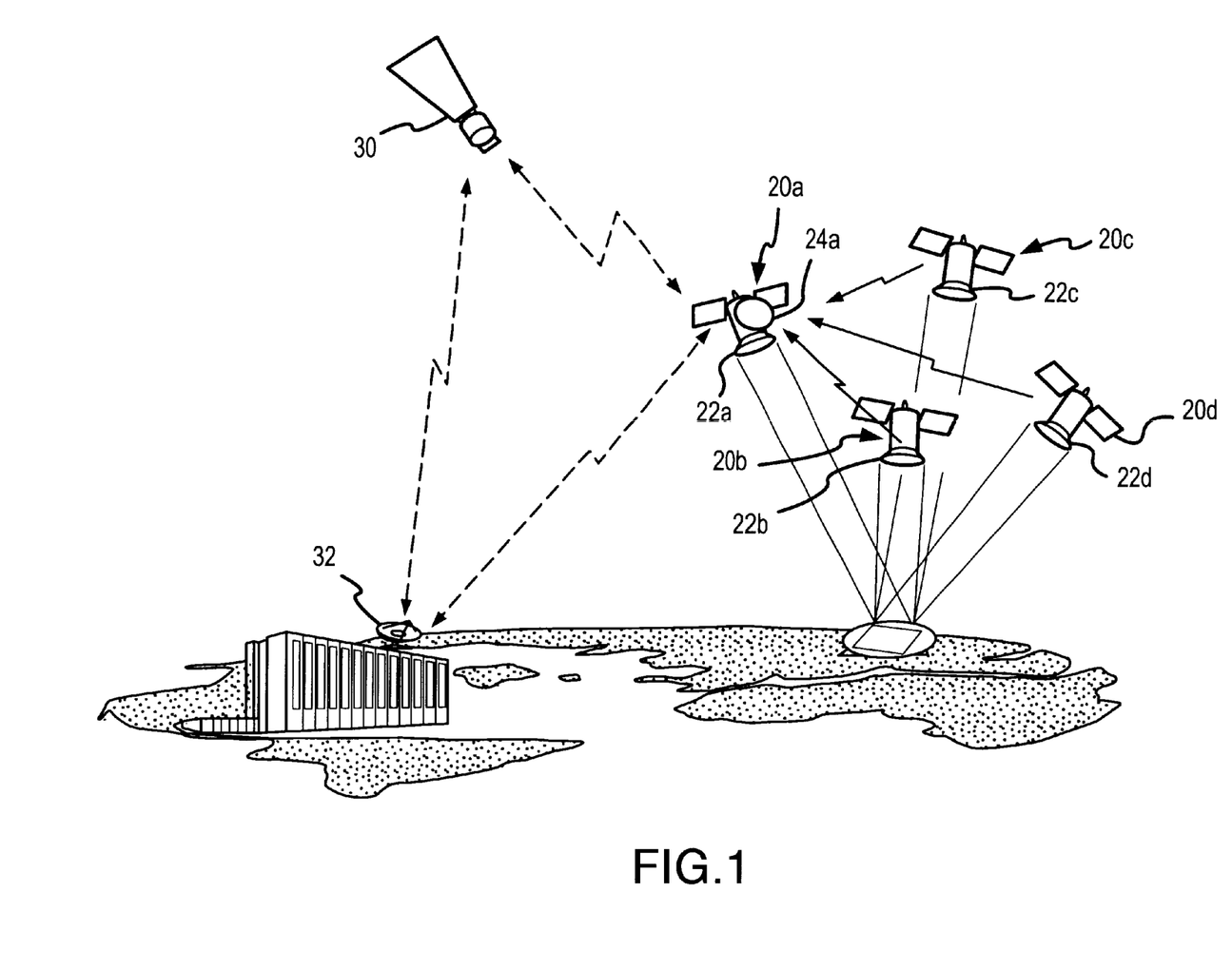
FIG. 1 illustrates one system embodiment of the present invention.

FIG. 1 illustrates an exemplary system embodiment 10 of the present invention. System 10 includes four space vehicles 20a, 20b, 20c and 20d, each having a collection antenna 22a, 22b, 22c and 22d mounted thereupon for receipt of thermal radiation emitted from a region of interest (ROI) on a planetary surface (e.g., within a circular access region). In the latter regard, antennas 22a, 22b, 22c and 22d should be provided for operation in a spotlight mode, e.g., wherein the antennas are gimbaled relative to the space vehicles to maintain a substantially common footprint over the ROI during imaging operations. The exemplary system 10 further includes a communications space vehicle 30 and ground station 32 for the transmission of control information and/or downloading of thermal emission data collected by antennas 22a, 22b, 22c and 22d.

In the latter regard, exemplary system 10 may be provided so that thermal emission data collected at space vehicles 20b, 20c and 20d may be relayed to space vehicle 20a for downloading via a communications antenna 24a to ground station 32 and subsequent processing for image formation. In alternate arrangements, the data may be uploaded to and at least partially processed at communications space vehicle 30, then downloaded to ground station 32 for further processing. In yet another arrangement, each of the space vehicles 20a, 20b, 20c and 20d may directly transmit the corresponding collected data for processing at the communications space vehicle 30 and/or ground station 32.

Space vehicles 20a, 20b, 20c and 20d may be located in known relative positions for imaging. By way of primary example, space vehicles 20a, 20b, 20c and 20d may comprise four satellites in a known constellation. That is, the satellites may be disposed in closely-related and repeatable orbits, wherein at least two of the satellites are horizontally offset and at least two of the satellites are vertically offset in a known geometry during imaging. Such horizontal and vertical spacing is preferred so that a predetermined resolution can be achieved with antennas 22a, 22b, 22c and 22d collectively defining a sparse aperture arrangement. More particularly, such arrangement allows four sets of thermal emission data collected by antennas 20a, 20b, 20c and 20d to be processed in various combinations (e.g., six different simple combinations of two), wherein each combination yields a different interferometric phase measurement based upon a corresponding different baseline.

Figure 2:
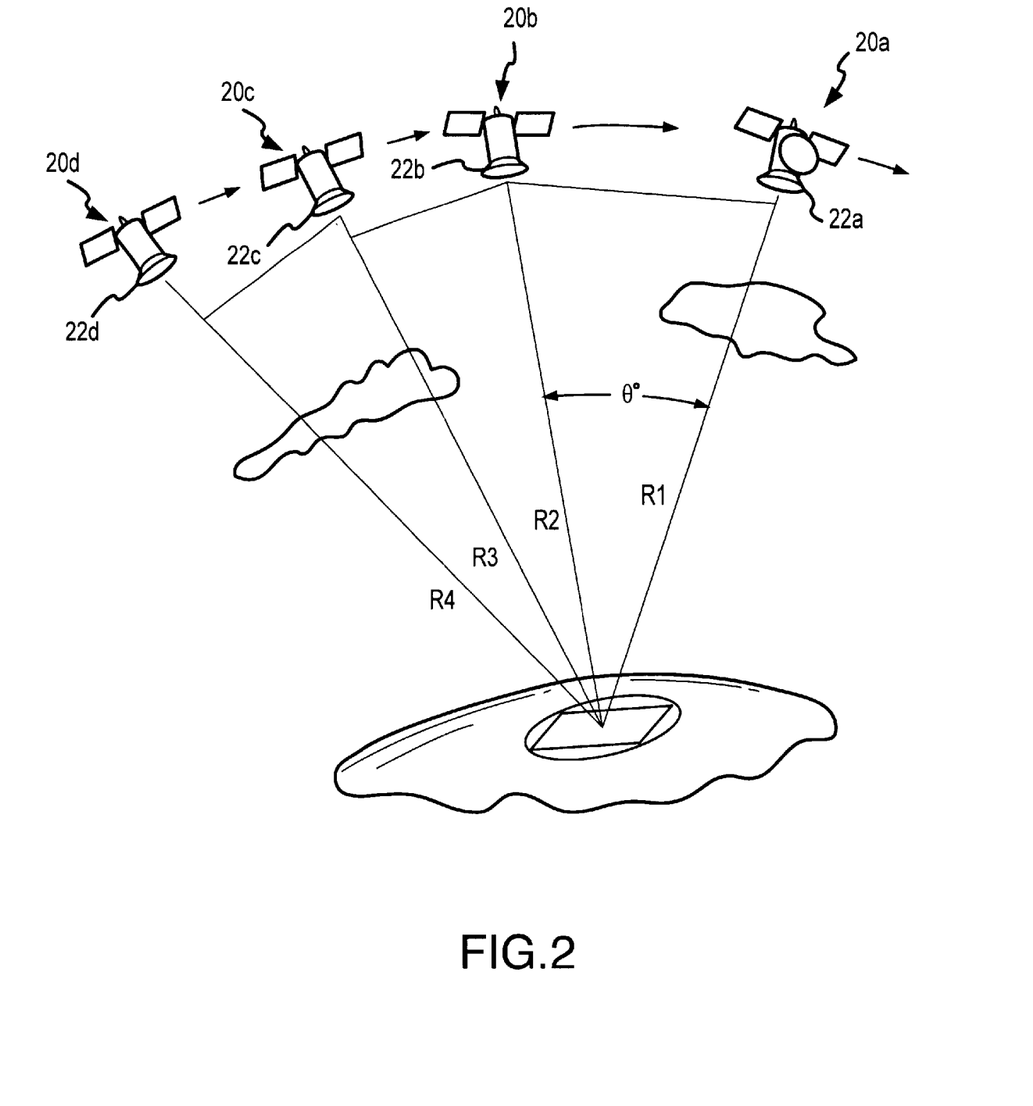
FIG. 2 illustrates satellite ranges for the system embodiment of FIG. 1.

For example, FIG. 2 illustrates satellites 20a, 20b, 20c and 20d in an arrangement in which antennas 22a, 22b, 22c, and 22d are disposed at corresponding ranges R1, R2, R3 and R4 relative to an ROI center point along their respective center imaging axes. By way of example, range differences between R1 and R2, R2 and R3, and R3 and R4 yield corresponding different baselines $\Delta R_{1,2}$, $\Delta R_{2,3}$, $\Delta R_{3,4}$ for purposes of interferometric measurements. Similarly, range differences between R1 and R3, R1 and R4, and R2 and R4 yield additional different baselines for interferometric measurements.

In addition to the noted vertical/horizontal spacing, space vehicles 20a, 20b, 20c and 20d may also be positioned to define a near-field imaging arrangement. That is, and referring again to FIG. 2, space vehicles 20a, 20b, 20c and 20d may be positioned so that the imaging center axes for at least two of the antennas 22a, 22b, 22c and/or 22d define an angle θ of at least about 2° therebetween, preferably 2° and 15° therebetween, and most preferably between about 6° to 10° therebetween. Relatedly, the antennas 22a, 22b, 22c and 22d may be provided to collect radiation over a bandwidth of about 1 MHz to 1 GHz with a center frequency of about 1 GHz to 100 GHz. Further, in earth-imaging applications, space vehicles 20a, 20b, 20c and 20d may be preferably positioned at elevations of no more than about 600 nmi, and most preferably between about 200 nmi and 500 nmi relative to a ROI.

In one configuration, four satellites may be located in low-earth orbits of about 400 nmi. To do so, the satellites may be carried by a single launch vehicle to a predetermined orbital altitude, then deployed from the launch vehicle. In turn, thrusters on the satellites may be utilized as needed to define a known constellation with use of an on-board positioning system (e.g., a system referenced to the Global Positioning System (GPS)). By way of example, the satellites may be positioned to laterally define a Y-shaped constellation relative to the earth surface. In such an arrangement, the satellites may be located in orbits that yield satellite spacings of between about 60 nmi and 120 nmi.

During imaging, antennas 22a, 22b, 22c and 22d may be controlled to substantially simultaneously collect thermal radiation emitted from the ROI over a common, predetermined dwell period. Further, and as previously noted, antennas 22a, 22b, 22c and 22d may be provided to collect radiation in a spotlight mode over a collection bandwidth of between about 1 MHz and 1 GHz, with a center frequency of between about 1 GHz and 100 GHz. In turn, the collected radiation may be sampled/digitized at antennas 22a, 22b, 22c and 22d (e.g., at a rate of between about 1.2 MHz and 1.2 GHz) for on-board thermal emission data storage on space vehicles 20a, 20b, 20c and 20d, and subsequent downloading/processing for image formation purposes.

Figure 3:
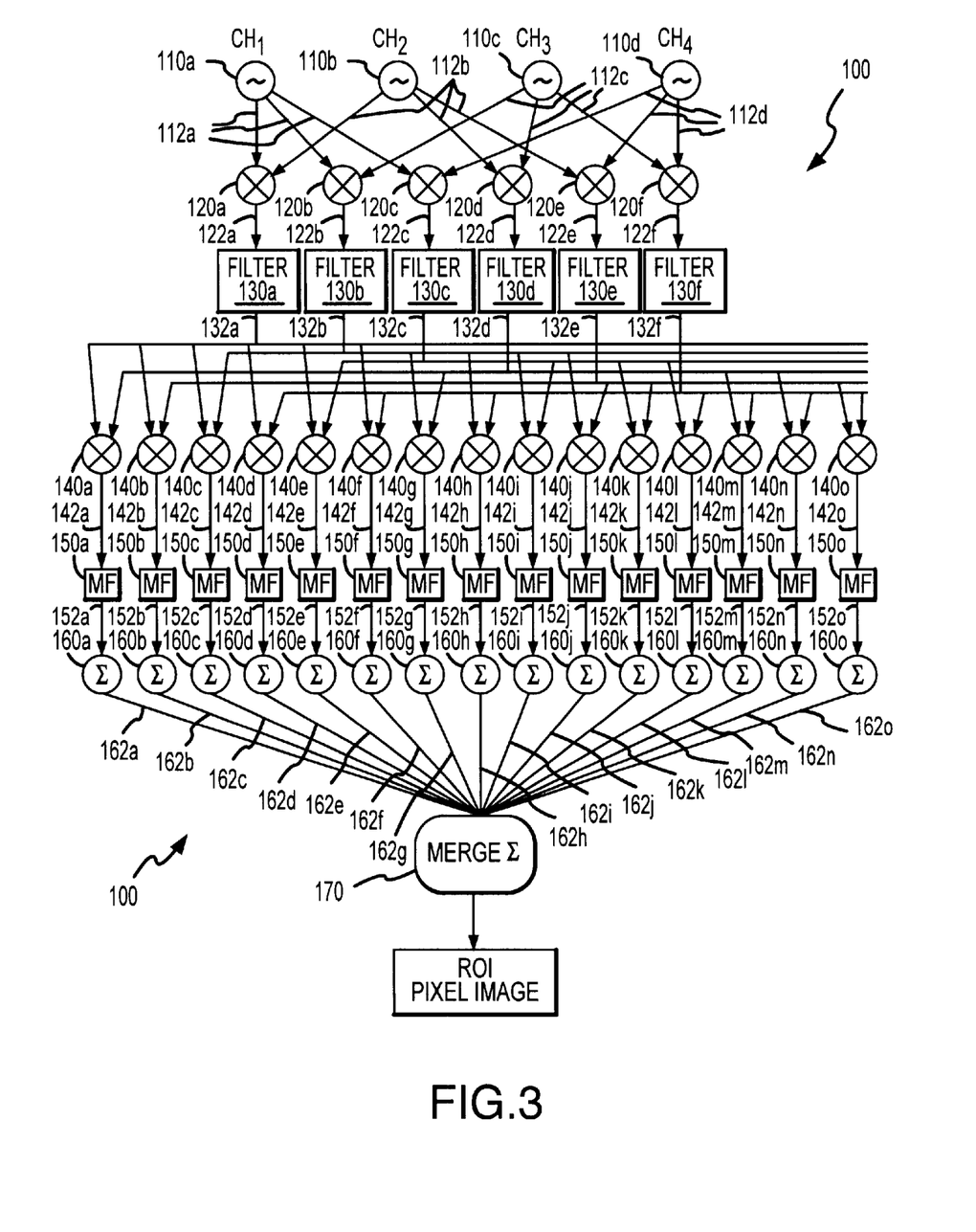
FIG. 3 is a schematic illustration of a processor means embodiment employable in the system of FIG. 1.

In the latter regard, reference is now made to FIG. 3 which schematically illustrates a processing means embodiment 100 employable in system 10. In the illustrated embodiment 100, the digitized thermal emission signals collected by antennas 22a, 22b, 22c and 22d may be introduced for signal processing via corresponding channels 110a, 110b, 110c and 110d. More particularly, the collected thermal emission signals 112a, 112b, 112c and 112d may be characterized as a function of time (t) as follows:

$$S_1(t)=a(t)e\ j(\omega(t-R1/c)+\phi(t)),$$

$$S_2(t)=a(t)e\ j(\omega(t-R2/c)+\phi(t)),$$

$$S_3(t)=a(t)e\ j(\omega(t-R3/c)+\phi(t)),$$

and $$S_4(t)=a(t)e\ j(\omega(t-R4/c)+\phi(t)),$$

respectively, wherein a(t) defines the random amplitude and φ(t) defines the random phase of thermal emissions from a ROI, and wherein ω is the radio frequency within the operating band of the antennas 22a–22d and c is the speed of light.

As illustrated in FIG. 3, the thermal emission signals 112a, 112b, 112c and 112d in channels 110a, 110b, 110c and 110d may be combined in differing permutations, or sets, of two at combiners 120a–120f to obtain interferometric phase differences therebetween. That is, combiners 120a–120f may provide for the mixing of corresponding data samples comprising two different thermal emission signals introduced via channels 120a, 120b, 120c, and 120d to obtain combined, or simple interferometric fringe signals 122a–122f. While not shown, the data comprising one signal of any given pair of signals 112a, 112b, 112c and 112d to be combined may be time-shifted in relation to the other signal to ensure mutual coherence. In one arrangement signal mixing at combiners 120a–120f may be achieved via multiplication of one thermal emission signal by the complex conjugate of another thermal emission signal. By way of example, when the signals on channels 110a and 110b are multiplied and the signals on channels 110c and 110d are multiplied, the resultant simple interferometric fringe signals 122a and 122f, respectively, may be characterized as follows:

$$S_{1,2}(t)=S_1(t)\cdot S_2(t)^*=a^2(t)e^{j\omega(R2-R1)/c};$$

and $$S_{3,4}(t)=S_3(t)\cdot S_4(t)^*=a^2(t)e^{j\omega(R3-R4)/c};$$

wherein "*" denotes the complex conjugate.

As may be appreciated, each combined signal 122a–122f may define a time-varying interference pattern, or simple fringe phase function, over an ROI. For example, the simple fringe phase functions corresponding with the signals $S_{1,2}(t)$ and $S_{3,4}(t)$ noted above may be characterized as follows:

$$\phi_{1,2}(t)=2\pi(R2(t)-R1(t))/\lambda;$$

and $$\phi_{3,4}(t)=2\pi(R4(t)-R3(t))/\lambda.$$

In the noted arrangement, multiplication of the various thermal emission signals 112a, 112b, 112c and 112d at combiners 120a–120f will result in simple interferometric fringe signals 122a–122f, each having a doubled bandwidth relative to that of the thermal emission signals introduced to the combiners 120a–120f. As such, in order to maintain Nyquist integrity, and depending upon the radiation frequency collected and sampling rate at antennas 22a, 22b, 22c and 22d, processor means embodiment 100 may further provide for the "up-sampling" of the thermal emission signals 112a–112d (not shown) prior to signal combining at combiners 120a–120f. Such up-sampling may be implemented via software functionality that provides for the interpolation of successive data values comprising signals 112a–112d to increase the number of data values for further processing. After signal combining at combiners 120a–120f, the resultant simple interferometric fringe signals 122a–122f may be low-pass filtered at filters 130a–130f (e.g., at a frequency of about 1 MHz or less) so as to remove high frequency components and otherwise yield signal averaging. In the latter regard, such averaging serves to effectively remove amplitude randomness from the collected thermal emissions.

As further illustrated by FIG. 3, the averaged simple interferometric fringe signals 132a–132f may be further combined in differing permutations, or sets, of two at combiners 140a–140o to obtain compound interferometric fringe signals 142a–142o. In particular, combiners 140a–140o may provide for the mixing of corresponding data values comprising two different averaged simple interferometric fringe signals 132a–132f (e.g., via multiplication), wherein each combination will further define a time-varying interference pattern or compound fringe phase function, over an ROI. By way of example, the compound fringe phase function corresponding with multiplication of the simple interferometric fringe signals $S_{1,2}(t)$ and $S_{3,4}(t)$ noted above may be characterized as follows:

$$\phi_{1,2,3,4}(t)=\phi_{1,2}(t)\phi_{3,4}(t)=2\pi(R1(t)-R2(t)-R4(t)-R3(t))/\lambda.$$

As may be appreciated, when combiners 140a–140o provide for multiplication of averaged simple fringe signals 132a–132f there will be a resultant doubling of bandwidth. As such, the down-sampling frequency at filters 130a–130f may be set to preserve Nyquist integrity at combiners 140a–140f. Although not shown in FIG. 3, it should also be noted that the formation of compound fringes at mixers 140a–140o may alternately and/or additionally be obtained by the mixing of any one of the thermal emission image signals 112a, 112b, 112c or 112d with any one of the simple interferometric fringe signals 122a, 122b, 122c, 122d, 122e and/or 122f.

Following formation of the compound interferometric fringe signals 142a–142o, the illustrated processing means embodiment 100 provides for the application of matched filters 150a–150o to yield compound signals 152a–152o. More particularly, a separate matched filter corresponding with each of a plurality of pixel locations (e.g., corresponding with the ROI pixel image to be formed) may be applied to each of the data values comprising each of the compound interferometric fringe signals 142a–142o to extract pixel values (e.g., amplitude-containing values) therefrom (e.g., via a simple dot product operation).

In this regard, matched filters 150a–150o may be developed on a per pixel location basis in relation to the imaged ROI and the particular combination of averaged simple interferometric fringe signals 132a–132o and/or thermal emission signals 112a–112d combined at combiners 140a–140b. Each such matched filter may effectively define the predicted interfermetic phase difference, or interferometric phase function, for the given pixel location and the given combination of thermal emission signals 112a–112d and/or averaged simple interferometric fringe signals 122a–122o mixed for interferometric image formation. As will be appreciated, such matched filters may be based on known geometries between each of the antennas 122a, 122b, 122c and 122d, in relation to the ROI, together with terrain data (e.g., elevation data) for the ROI. Such terrain data may be predetermined and/or otherwise derived on a dynamic basis from the complex image signals 112a, 112b, 112c and 112d (e.g., via a split aperture/auto-focus technique).

Pursuant to or in conjunction with the application of matched filters 150a–150o, the resultant compound signals 152a–152o may be further processed by integration modules 160a–160o to obtain integrated interferometric image signals 162a–162o. In this regard, modules 160a–160o provide for integration (e.g., summation) of the extracted pixel values corresponding with each given pixel location corresponding with the ROI pixel image to be formed. In turn, the integrated pixel values comprising each of the integrated interferometric image signals 162a–162o combinatively define a corresponding interferometric image for use in ROI pixel image formation.

That is, each of the integrated interferometric image signals 162a–162o may be merged at merge module 170 to yield a composite interferometic image, or thermal image, of the ROI. In this regard, the integrated interferometric image signals 162a–162o may be simply averaged at module 170. Alternatively, module 170 may provide for weighted averaging of the signals 162a–162o, wherein the signals 162a–162o are weighted in a predetermined manner. A third alternative at module 170 may provide for complex summation of data comprising signals 162a–162o.

Figure 4:
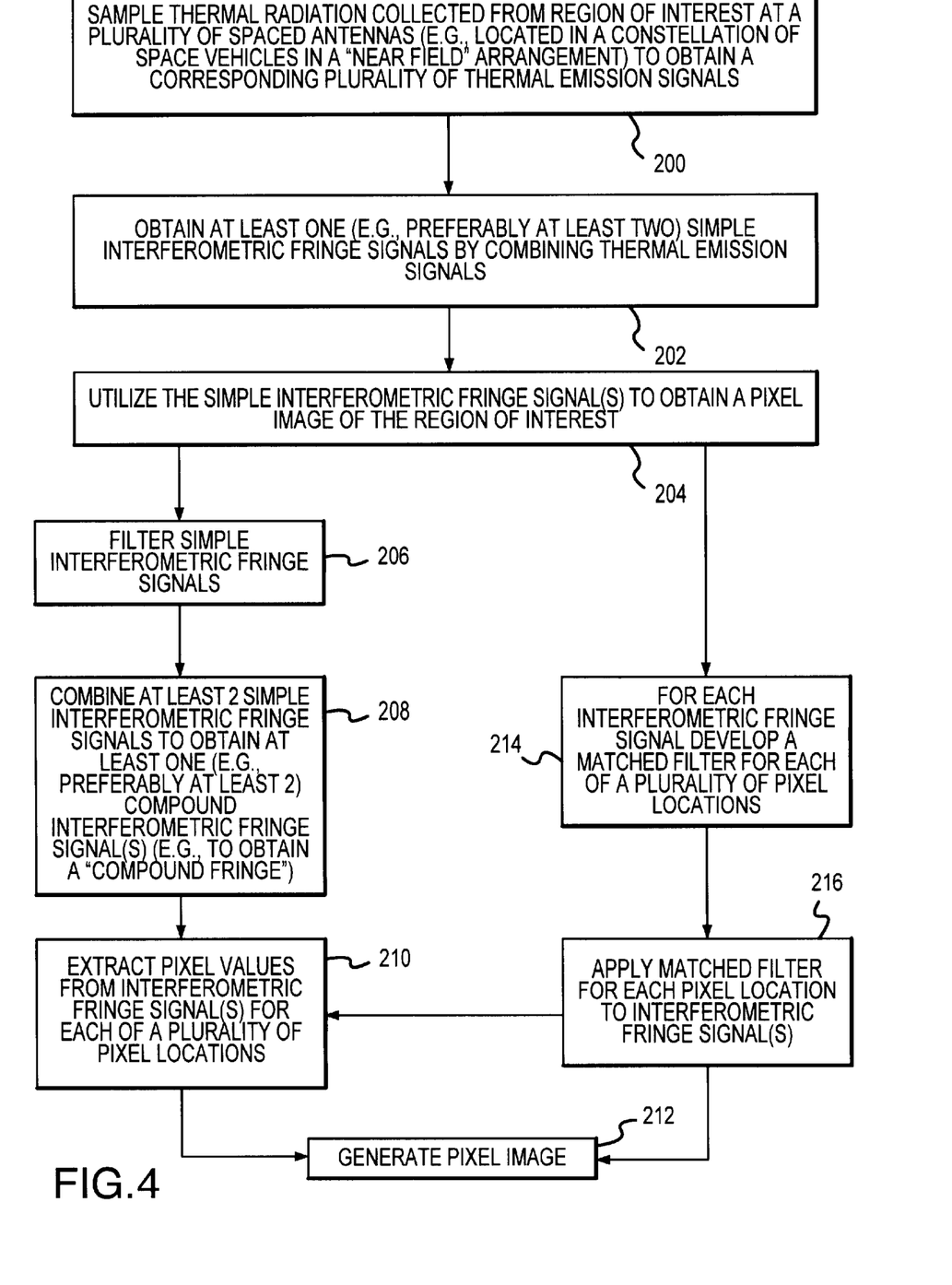
FIG. 4 is a process diagram showing steps employable in the system embodiment of FIG. 1.

Operation of the system embodiment 10 described above will now be briefly summarized with reference to FIG. 4. Initially, thermal emissions from an ROI may be collected and sampled at a plurality of antennas to obtain a corresponding plurality of thermal emission signals (Step 200). In relation to the above-described embodiment, antennas 22a–22d located on corresponding satellites 20a–20d may be employed in a spotlight mode. As previously indicated, the satellites 20a–20d may be located so that antennas 22a–22d are disposed in a near field imaging arrangement and so that the antennas 22a–22d collectively define a sparse aperture.

Following obtainment of a plurality of thermal emission signals, at least one and preferably a plurality of simple interferometric fringe signals may be formed (Step 202). In relation to the above-described embodiment, thermal emission signals 112a–112d may be multiplied at combiners 120a–120f to form simple interferometric fringe signals 122a–122f.

As illustrated in FIG. 4, the simple interferometric fringe signal(s) may be utilized to form a pixel image of the region of interest (Step 204). In particular, the simple interferometric fringe signal(s) may be filtered (Step 206) in order to remove high-frequency components and correspondingly average each of the signal. In relation to the above-described embodiment, low-pass filters 130a–130f may be utilized for such signal averaging.

Then, at least two averaged simple interferometric fringe signals may be combined to obtain at least one compound interferometric fringe signal (Step 208). In relation to the above-described processing embodiment, the formation of compound interferometric fringe signal(s) 142a–142o may entail the multiplication of averaged simple interferometric fringe signals 132a–132f at combiners 140a–140o. As will be appreciated multiple successive levels of compound fringe signals may be formed from compound fringe signals formed in a preceding stage.

Following the formation of the compound interferometric fringe signal(s), pixel values may be extracted therefrom for each of a plurality of pixel locations (Step 210). Such pixel locations correspond with the ROI pixel image to be formed. As will be appreciated, the extracted pixel values may be utilized to generate a pixel image (Step 212). In this regard, the extracted pixel values for each given interferometric fringe signal may be combined to generate a corresponding interferometric image or image signal. In turn, such interferometric image(s) may be employed to generate an ROI pixel image.

As noted in FIG. 4, the extraction of pixel values from the interferometric fringe signals may entail the development of matched filters for each of a plurality of pixel locations in corresponding relation to each given interferometric fringe signal employed for image formation (Step 214). In turn, such matched filters may be applied in corresponding relation to each interferometric fringe signal on a pixel location-specific basis (Step 216). In relation to the above-described embodiment, matched filters 150a–150o may be employed for pixel value extraction. Then, for each resultant signal 152a–152o the extracted pixel values for each given pixel location may be integrated at integration modules 160a–160d to yield corresponding interferometric image signals 162a–162o. In turn, signals 162a–162o may be merged at module 170 for pixel image formation.

The embodiments described above are for exemplary purposes only and are not intended to limit the scope of the present invention. Various adaptations, modifications and extensions of the embodiment will be apparent to those skilled in the art and are intended to be within the scope of the invention as defined by the claims which follow.

What is claimed:

1. A method for obtaining an image of a planetary surface region of interest, comprising:

collecting thermal radiation emitted from a planetary surface region of interest (ROI) at each of a plurality of spaced antennas on separate space vehicles, and wherein each of said antennas provide a corresponding complex image signal;

combining a first complex image signal with a signal related to a second complex image signal to obtain a first interferometric image signal;

applying a different matched filter corresponding with each of a plurality of pixel locations to corresponding image data of said first interferometric image signal to obtain a plurality of amplitude values corresponding with each of said plurality of pixel locations; and, using said amplitude values in the formation of an image of said ROI.

2. A method as recited in claim 1, wherein center imaging axes for at least two of the antennas define an angle of at least about 2° therebetween.

3. A method as recited in claim 1, wherein the signal related to the second complex image signal is a complex conjugate of the second complex image signal.

4. A method as recited in claim 1, wherein said using step includes:
averaging said amplitude values corresponding with each of the said plurality of pixel locations on a pixel-by-pixel basis.

5. A method as recited in claim 1, wherein each said matched filter defines a predetermined one of a predicted interferometric phase difference or a predicted interferometric phase function for the corresponding pixel location.

6. A method as recited in claim 5, wherein each of said matched filters are based upon known geometries of said plurality of spaced antennas in relation to said ROI and terrain data for said ROI.

7. A method as recited in claim 6, wherein said terrain data is one of predetermined data and dynamically determined data derived from said complex image signals.

8. A method as recited in claim 1, wherein said applying step comprises:
completing a dot product operation in relation to each of said plurality of pixel locations to obtain said plurality of amplitude values.

9. A method as recited in claim 1, wherein said radiation in said collecting element substantially comprises thermal radiation emitted from said ROI at frequencies between about 1 GHz and 100 GHz.

10. A method as recited in claim 9, wherein said radiation is collected within a collection bandwidth of between about 1 Mhz and 1 GHz.

11. A method as recited in claim 1, further comprising:
combining said first interferometric image signal with another complex image signal for said ROI to obtain at least a first compound interferometric image signal for use in said applying step.

12. A method as recited in claim 11, wherein:
said first combining element further includes combining one of said first and second complex image signals with a complex conjugate of a third complex image signal to obtain a second interferometric image signal; and,
said another complex image signal is one of (i) said second interferometric image signal, and (ii) one of said first, second and third complex image signals.

13. A method as recited in claim 1, wherein said space vehicles are positioned at an altitude of less than about 600 nautical miles relative to said ROI.

14. A method as recited in claim 13, wherein said space vehicles are positioned at an altitude of between about 200 and 500 nautical miles relative to said ROI.

15. A method as recited in claim 1, wherein said plurality of space vehicles comprise a corresponding plurality of satellites positioned in a predetermined constellation.

16. A method as recited in claim 1, wherein said plurality of satellites are maintained in orbital planes, wherein at least two of said plurality of satellites are located in corresponding parallel orbital planes which are horizontally offset and at least two of said plurality of satellites are located in corresponding parallel orbital planes which are vertically offset.

17. A method as recited in claim 16, wherein said horizontal and vertical offsets are in the range of about 60 to 120 nautical miles.

18. A method as recited in claim 1, wherein said using step includes:
integrating the amplitude values to obtain integrated image signals.

19. A method as recited in claim 18, wherein said using element further includes:
merging the integrated image signals to yield the ROI pixel image.

20. A method as recited in claim 19, wherein said merging includes simple averaging.

21. A method as recited in claim 19, wherein said merging includes weighted averaging.

22. A method as recited in claim 19, wherein said merging includes complex summation.

23. A method as recited in claim 1, wherein the plurality of spaced antennas on separate space vehicles includes at least four spaced antennas, one on each of four separate space vehicles.

24. A method as recited in claim 1, wherein each of the plurality of spaced antennas are operational to maintain a substantially consistent footprint over the ROI.

25. A method as claimed in claim 24, wherein at least one of the plurality of spaced antennas is mounted in a gimbaled arrangement.

26. A system for obtaining an image of a region of interest, comprising:
a plurality of space vehicles located in predetermined relative positions over a planetary surface region of interest (ROI);
a plurality of antennas, each located on a different one of said plurality of space vehicles for collecting radiation from said planetary surface region of interest and providing a complex image signal in response thereto; and,
a processor that combines a first complex image signal with a signal related to a second complex image signal to obtain a first interferometric image signal and applies a different matched filter corresponding with each of a plurality of pixel locations to corresponding image data comprising said first interferometric image signal to obtain a plurality of amplitude values corresponding with each of said plurality of pixel locations, wherein said amplitude values are employable in the formation of an pixel image of said ROI.

27. A system as defined in claim 26, wherein said space vehicles are located so that center imaging axes for at least two of the antennas define an angle of at least 2° therebetween.

28. A system as defined in claim 26, wherein said signal related to the second complex image signal is a complex conjugate of the second complex image signal.

29. A system as recited in claim 26, wherein said processor is operable to average said amplitude values corresponding with each of said plurality of said pixel locations on a pixel-by-pixel basis, and wherein said averaged amplitude values corresponding with each of said pixel locations are employable in the formation of said pixel image.

30. A system as recited in claim 26, wherein each said matched filter defines a predetermined one of a predicted interferometric phase difference or a predicted interferometric phase function for the corresponding pixel location.

31. A system as recited in claim 26, wherein each of said matched filters are based upon known geometries of said plurality of spaced antennas in relation to said ROI and based upon terrain data for said ROI.

32. A system as recited in claim 31, wherein said terrain data is one of predetermined data and dynamically determined data derived from said complex image signals.

33. A system as recited in claim 26, wherein said plurality of space vehicles is defined by corresponding plurality of satellites located in a predetermined constellation.

34. A system as recited in claim 33, wherein at least two of said plurality of satellites are located in corresponding parallel orbital planes which are horizontally offset, and wherein at least two of said plurality of satellites are located in the corresponding parallel orbital planes which are vertically offset.

35. A system as defined in claim 34, wherein said horizontal and vertical offsets are in the range of about 60 to 120 nautical miles.

36. A system as recited in claim 26, wherein said plurality of space vehicles are positioned so that said corresponding plurality of antennas are located at different distances from said ROI as measured along the respective center image axes.

37. A system as defined in claim 26, wherein the radiation collected by the plurality of spaced antennas is substantially in the range of between about 1 GHz and 100 GHz.

38. A system as defined in claim 37, wherein the radiation collected is within a collection bandwidth of between about 1 Mhz and 1 GHz.

* * * * *